(12) United States Patent
Bedingfield et al.

(10) Patent No.: US 11,913,593 B2
(45) Date of Patent: Feb. 27, 2024

(54) BLOWABLE FLEXIBLE INNERDUCT

(71) Applicant: Milliken & Company, Spartanburg, SC (US)

(72) Inventors: Steven L Bedingfield, LaGrange, GA (US); Andrew Broadway, Fountain Inn, SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 17/984,849

(22) Filed: Nov. 10, 2022

(65) Prior Publication Data

US 2023/0175613 A1    Jun. 8, 2023

Related U.S. Application Data

(60) Provisional application No. 63/286,890, filed on Dec. 7, 2021.

(51) Int. Cl.
*F16L 7/00* (2006.01)
*D03D 1/02* (2006.01)
(Continued)

(52) U.S. Cl.
CPC ............... *F16L 7/00* (2013.01); *D03D 1/02* (2013.01); *D03D 3/02* (2013.01); *D03D 15/283* (2021.01);
(Continued)

(58) Field of Classification Search
CPC .... F16L 7/00; D03D 1/02; D03D 3/02; D03D 15/283; D03D 13/008; D03D 15/573;
(Continued)

(56) References Cited

U.S. PATENT DOCUMENTS 3,911,200 A    10/1975    Simons
4,281,211 A    7/1981    Tatum
(Continued)

FOREIGN PATENT DOCUMENTS

CN    1277643    12/2000
CN    1375071    10/2002
(Continued)

OTHER PUBLICATIONS

International Search Report and Written Opinion issued in App. No. PCT/US2022/079872, dated Mar. 14, 2023, 16 pages.

*Primary Examiner* — Rick K Chang
(74) *Attorney, Agent, or Firm* — Cheryl J. Brickey

(57) ABSTRACT

The process of forming a blowable flexible innerduct contains the steps of forming an inner innerduct structure comprising at least one inner longitudinal chamber, where the at least one inner longitudinal chamber comprises an inflatable tube and forming a textile. Concurrently forming an outer innerduct structure from the textile having at least one outer longitudinal chamber and inserting at least one inner longitudinal chamber into at least one of the outer longitudinal chambers. The inflatable tube has a wall thickness of less than about 0.5 mm. The inner longitudinal chamber alone has an air permeability of less than about 1 cfm, outer longitudinal textile chamber alone has an air permeability of greater than about 100 cfm, and the outer and inner longitudinal textile chambers together have an air permeability of less than about 1 cfm.

20 Claims, 10 Drawing Sheets

(51) Int. Cl.
*D03D 3/02* (2006.01)
*D03D 15/283* (2021.01)

(52) U.S. Cl.
CPC ...... *D10B 2331/02* (2013.01); *D10B 2331/04* (2013.01); *D10B 2505/20* (2013.01)

(58) Field of Classification Search
CPC ............ D10B 2331/02; D10B 2331/04; D10B 2505/20; D10B 2201/01; D10B 2321/021; D10B 2321/022; D10B 2331/021; D10B 2331/10; D10B 2401/061; D10B 2401/063
See application file for complete search history.

(56) References Cited

U.S. PATENT DOCUMENTS

| | | | |
|---|---|---|---|
| 4,582,093 | A | 4/1986 | Hubbard |
| 4,602,763 | A | 7/1986 | Gaylin |
| 4,761,194 | A | 8/1988 | Pithouse |
| 4,862,922 | A | 9/1989 | Kite, III |
| 4,929,478 | A | 5/1990 | Conaghan |
| 5,016,859 | A | 5/1991 | Zimmer |
| 5,027,864 | A | 7/1991 | Conti |
| 5,442,136 | A | 8/1995 | Allen |
| 5,513,149 | A | 4/1996 | Salmi |
| 5,587,115 | A | 12/1996 | Allen |
| 5,789,711 | A | 8/1998 | Gaeris |
| 5,843,542 | A | 12/1998 | Brushafer |
| 5,969,295 | A | 10/1999 | Boucino |
| 6,178,278 | B1 | 1/2001 | Keller |
| 6,251,201 | B1 | 6/2001 | Allen |
| 6,262,371 | B1 | 7/2001 | Allen |
| 6,304,698 | B1 | 10/2001 | Morris |
| 6,398,190 | B1 | 6/2002 | Li |
| 6,421,485 | B2 | 7/2002 | Morris |
| 6,471,440 | B1 | 10/2002 | Scheiwiller |
| 6,571,833 | B1 | 6/2003 | McLarty, III |
| 6,718,100 | B2 | 4/2004 | Morris |
| 6,876,797 | B2 | 4/2005 | Morris |
| 6,886,601 | B2 | 5/2005 | Allen |
| 6,963,031 | B2 | 11/2005 | Gladfelter |
| 7,078,615 | B2 | 7/2006 | Gladfelter |
| 7,085,455 | B2 | 8/2006 | Morris |
| 7,085,458 | B2 | 8/2006 | Morris |
| 7,174,074 | B2 | 2/2007 | Morris |
| 7,319,802 | B2 | 1/2008 | Morris |
| 7,512,668 | B2 | 3/2009 | Koegel |
| 7,621,505 | B2 | 11/2009 | Hamrick |
| 7,754,971 | B2 | 7/2010 | Bedingfield |
| 7,799,997 | B2 | 9/2010 | Bedingfield |
| 7,873,028 | B2 | 1/2011 | Lam |
| 8,387,954 | B2 | 3/2013 | Allen |
| 8,809,682 | B2 | 8/2014 | Hepfinger |
| 9,362,725 | B2 | 6/2016 | Morris |
| 9,577,840 | B2 | 2/2017 | Lam |
| 10,254,498 | B2 | 4/2019 | Bedingfield |
| 10,829,874 | B2 | 11/2020 | Bedingfield |
| 11,008,680 | B2 | 5/2021 | Bedingfield |
| 2003/0015248 | A1 | 1/2003 | Itoh |
| 2003/0123824 | A1 | 7/2003 | Tatarka |
| 2003/0142933 | A1 | 7/2003 | Morris |
| 2003/0183291 | A1 | 10/2003 | Allen |
| 2003/0185527 | A1 | 10/2003 | Morris |
| 2004/0033035 | A1 | 2/2004 | Morris |
| 2004/0081411 | A1 | 4/2004 | Gladfelter |
| 2005/0047735 | A1 | 3/2005 | Morris |
| 2005/0185902 | A1 | 8/2005 | James |
| 2006/0016507 | A1 | 1/2006 | Baer |
| 2006/0117807 | A1 | 6/2006 | Reiter |
| 2008/0054236 | A1* | 3/2008 | Morris ............ H02G 9/06 254/134.4 |
| 2008/0264669 | A1 | 10/2008 | Bedingfield |
| 2009/0218002 | A1 | 9/2009 | Kashihara |
| 2012/0073854 | A1 | 3/2012 | Allen |
| 2012/0132309 | A1 | 5/2012 | Morris |
| 2012/0187271 | A1 | 7/2012 | Komiya |
| 2017/0145603 | A1 | 5/2017 | Bedingfield |
| 2020/0208759 | A1 | 7/2020 | Iaciofano |

FOREIGN PATENT DOCUMENTS

| | | |
|---|---|---|
| CN | 1679120 | 10/2005 |
| CN | 101548216 | 9/2009 |
| CN | 102007239 | 4/2011 |
| CN | 102560802 | 7/2012 |
| CN | 102611045 | 7/2012 |
| CN | 106995969 | 8/2017 |
| CN | 206502927 | 9/2017 |
| CN | 211151396 | 7/2020 |
| CN | 213476233 U | 6/2021 |
| DE | 10204019 | 8/2003 |
| DE | 102012100359 | 7/2012 |
| EP | 0045212 | 4/1984 |
| EP | 0225152 A2 | 6/1987 |
| EP | 1254980 | 11/2002 |
| EP | 1385246 | 1/2004 |
| GB | 2084505 | 5/1984 |
| JP | 2005116534 | 4/2005 |
| KR | 200473979 | 8/2014 |
| WO | 0209249 A1 | 1/2002 |
| WO | 03092134 A1 | 11/2003 |
| WO | 2004020888 | 3/2004 |
| WO | 2008027467 | 3/2008 |
| WO | 2008070819 | 6/2008 |
| WO | 2010015872 A1 | 2/2010 |

* cited by examiner

BLOWABLE FLEXIBLE INNERDUCT

RELATED APPLICATIONS

This application claims priority to Provisional Patent Application 63/286,890 filed on Dec. 7, 2021, which is herein incorporated by reference.

TECHNICAL FIELD OF THE INVENTION

The present invention is directed towards blowable textile innerduct structures especially for us in conduit systems.

BACKGROUND

Flexible innerduct structures have chambers and are used within conduits to help segregate individual cables into compartments or channels within the innerduct, to maximize the number of cables that may be positioned in a conduit, and to facilitate insertion of cables into the conduit by preventing cable-against-cable friction and providing a tape or rope inside each compartment of the innerduct.

To form more than one chamber in an innerduct structure, typically a seam is used to attach the layers together (this could be multiple pieces of textile, a textile folded onto itself, or a combination of both). In some applications, cables are pulled through the innerduct chambers, but in other applications it is preferably to blow the cables into the chambers. To be able to blow into the innerduct, the chamber needs to be air impermeable (or essentially air impermeable) and strong enough not to burst under the blowing pressure.

It is desirable to have a blowable flexible innerduct that allows the innerduct and/or cables in the innerduct to be blow into the conduit using air or another compressed gas in addition to being able to be pulled or pushed into the conduit/innerduct.

BRIEF SUMMARY OF THE INVENTION

In one embodiment, the invention relates to a blowable flexible innerduct contains an outer innerduct structure and an inner innerduct structure. The outer innerduct structure contains at least one outer longitudinal chamber formed from at least one textile. The inner innerduct structure contains at least one inner longitudinal chamber, where each inner longitudinal chamber is located within an outer innerduct textile chamber and the at least one inner longitudinal chamber contains an inflatable tube. The inflatable tube has a wall thickness of less than about 0.5 mm. The inner longitudinal chamber alone has an air permeability of less than about 1 cfm, outer longitudinal textile chamber alone has an air permeability of greater than about 100 cfm, and the outer and inner longitudinal textile chambers together have an air permeability of less than about 1 cfm.

In another embodiment, the invention relates to a conduit system containing conduit and a blowable flexible innerduct positioned inside the conduit. The blowable flexible innerduct contains an outer innerduct structure and an inner innerduct structure. The outer innerduct structure contains at least one outer longitudinal chamber formed from at least one textile. The inner innerduct structure contains at least one inner longitudinal chamber, where each inner longitudinal chamber is located within an outer innerduct textile chamber and the at least one inner longitudinal chamber contains an inflatable tube. The inflatable tube has a wall thickness of less than about 0.5 mm. The inner longitudinal chamber alone has an air permeability of less than about 1 cfm, outer longitudinal textile chamber alone has an air permeability of greater than about 100 cfm, and the outer and inner longitudinal textile chambers together have an air permeability of less than about 1 cfm.

In another embodiment, the invention relates to the process of forming a blowable flexible innerduct containing forming an inner innerduct structure comprising at least one inner longitudinal chamber, where the at least one inner longitudinal chamber comprises an inflatable tube. The process also includes the step of forming an outer innerduct structure containing at least one outer longitudinal chamber formed from at least one textile and concurrent to forming the outer innerduct structure, inserting at least one inner longitudinal chamber into at least one of the outer longitudinal chambers. The inflatable tube has a wall thickness of less than about 0.5 mm. The inner longitudinal chamber alone has an air permeability of less than about 1 cfm, the outer longitudinal textile chamber alone has an air permeability of greater than about 100 cfm, and the outer longitudinal textile chamber together with an inner longitudinal chamber located inside the outer longitudinal textile chamber has an air permeability of less than about 1 cfm.

DETAILED DESCRIPTION

Figure 1:
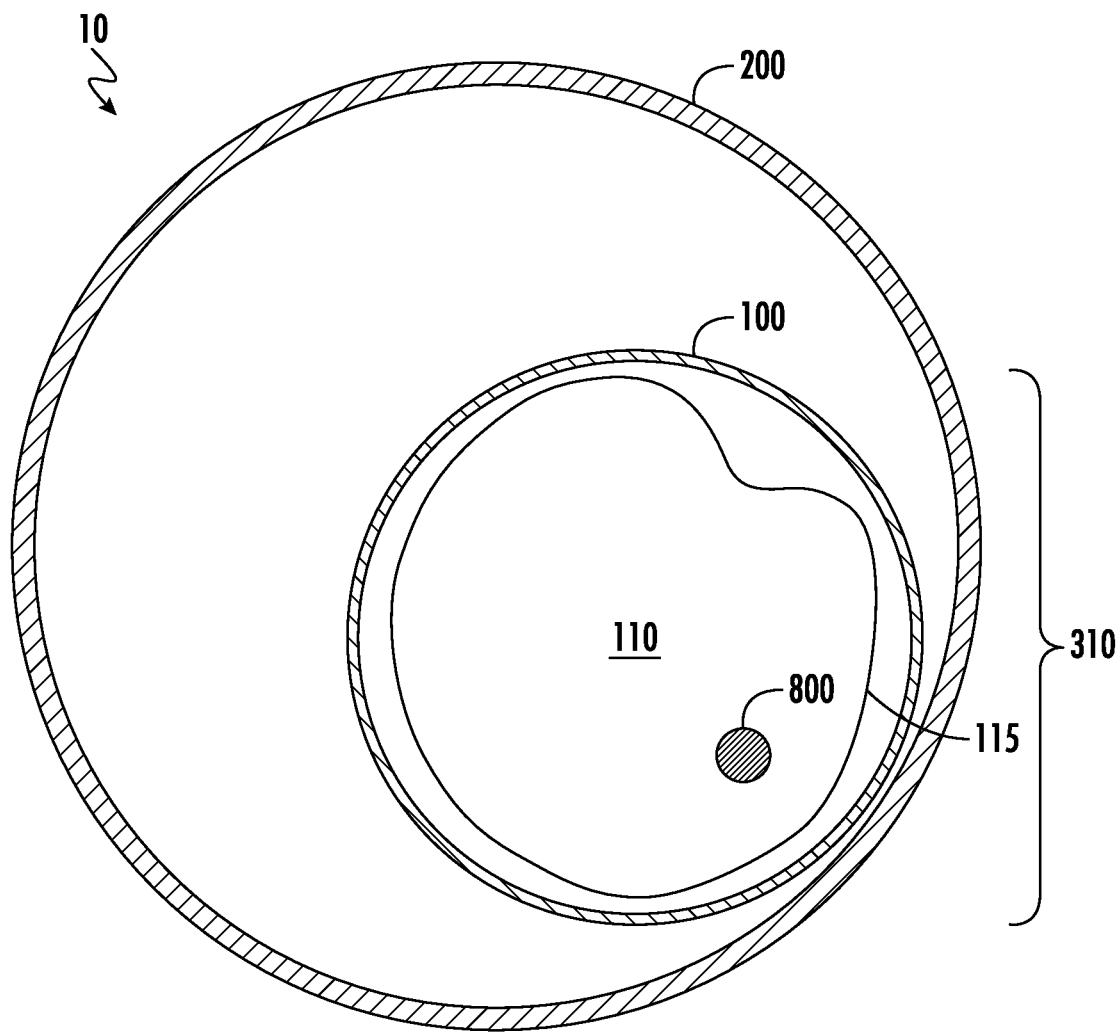
FIG. 1 illustrates one embodiment of the conduit system where the outer innerduct structure is a seamless tube.

FIG. 1 shows a conduit system 10. The conduit 200 (such as shown in FIG. 1) that the innerduct structures are inserted into may be of any suitable size (inner or outer diameter), material, and length. Conduits may also be referred to as ducts, pipes, elongated cylindrical elements, and others. Typically, the conduits 200 are made of a polymer, but other materials such as metal could also be used.

In one embodiment, the conduit 200 is a very small conduit having inner diameter less than about 75 mm, more preferably less than about 60 mm, more preferably less than about 50 mm, more preferably less than about 40 mm, more preferably less than about 35 mm, more preferably less than 33 mm, more preferably less than 30 mm. In another embodiment, the conduit 200 is a medium to large conduit having an inner diameter greater than about 100 mm, more preferably between about 1 and 3 inches, more preferably between about 3 and 10 inches.

The blowable innerduct structure 310 contains an outer innerduct structure 100 and an inner innerduct structure 115. The outer innerduct structure 100 contains at least one outer longitudinal textile chamber. The inner innerduct structure 115 contains at least one inner longitudinal chamber 110 (in FIG. 1) where the pull tapes, cables, and the like are and will be located and each inner longitudinal chamber 115 is located within an outer innerduct textile chamber 100.

The blowable flexible innerduct 310 has a longitudinal length and cross-sectional area. In one embodiment beneficial to smaller conduits, the blowable flexible innerduct 310 has a width of less than about 100 mm, more preferably less than about 75 mm, more preferably less than about 50 mm. The width of the textile innerduct is measured by flattening the textile innerduct structure (as sometimes the innerduct's natural cross-sectional state is circular or the lobes are slightly rounded and so the width appears smaller) and then the largest measurement across the cross-sectional area is defined to be the width. In one embodiment, the width of the textile innerduct structure is less than about 35 mm, more preferably less than about 30 mm.

The outer innerduct structure 100 contains at least one textile arranged such that the outer innerduct structure 100 contains at least one outer longitudinal chamber. The shape and structure of the outer innerduct structure 100 may be any suitable shape as long as it is formed by a textile and contains at least one outer longitudinal chamber.

Referring to FIG. 1, there is shown one embodiment of the outer innerduct structure 100 being a seamless textile tube (being shown in a conduit 200 in a conduit system 10). The seamless textile tube is may be formed using circular weaving or knitting, for example. The seamless tube may be formed in any suitable width. In one embodiment for smaller conduits, the width of the seamless tube is less than about 60 mm, more preferably less than about 50 mm, more preferably less than about 40 mm. A seamless tube may be preferred in some embodiments as there may be no further processing needed of the textile once the tube is formed to make it into the outer innerduct structure 100 and the tubes may be formed in small widths. In another embodiment, the textile may be a shuttle woven textile.

Figure 3:
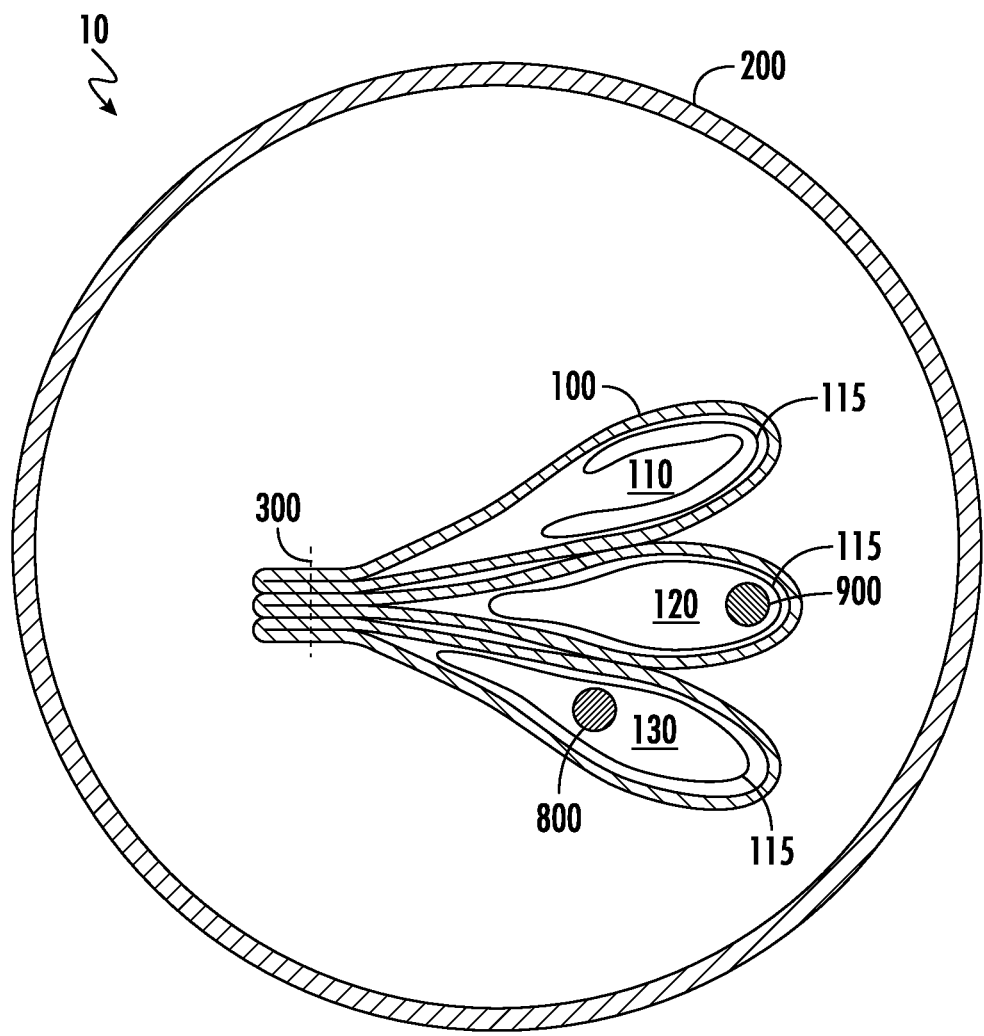
FIG. 3 illustrates one embodiment of a conduit system where the outer innerduct structure is multiple seamless tubes attached together.

The small seamless tubes may be used singly as shown in FIG. 1 or in multiples. Multiple separate seamless tubes may be placed into a conduit simultaneously or sequentially, with the tubes not being attached to one another (in one embodiment, the tubes may be temporarily attached together other during installation for ease of insertion into the conduit). In another embodiment, shown in FIG. 3, multiple (at least two) seamless tubes may be joined together before being inserted into a conduit. FIG. 3 shows the outer innerduct structure 100 containing three seamless tubes which are connected along one of the sides of the tubes using an attachment 300.

The attachment 300 may be formed using any suitable method. In one preferred embodiment, the attachment 300 is a sewn seam made by sewing the layers of textile together. Other methods of forming the attachment include stapling or riveting the textiles at intervals along the length, ultrasonic welding, or fastening the textile with a hot melt or solvent based adhesive. The textiles may also be provided with relatively low temperature melting fibers, which can be melted and allowed to cool, thereby fusing the structure together at the attachment.

The attachment 300 may be at one of the sides of the innerduct such as shown in FIG. 3, or it could be more towards the middle of the tubes which would serve to divide each tube into two chambers. The attachment could also be in different places for each tube. The three outer innerduct structures in FIG. 3 form three outer longitudinal chambers. In each of those outer longitudinal chambers is an inner innerduct longitudinal structure 115 forming inner longitudinal chambers 110, 120, and 130. If the attachment 300 were in the center of the innerduct structure 100 of FIG. 3, there would be 6 chambers formed (though each chamber would be smaller). The outer and inner innerduct structures may be different sizes and the attachment may be at a different point in the blowable flexible innerduct.

Figure 4:
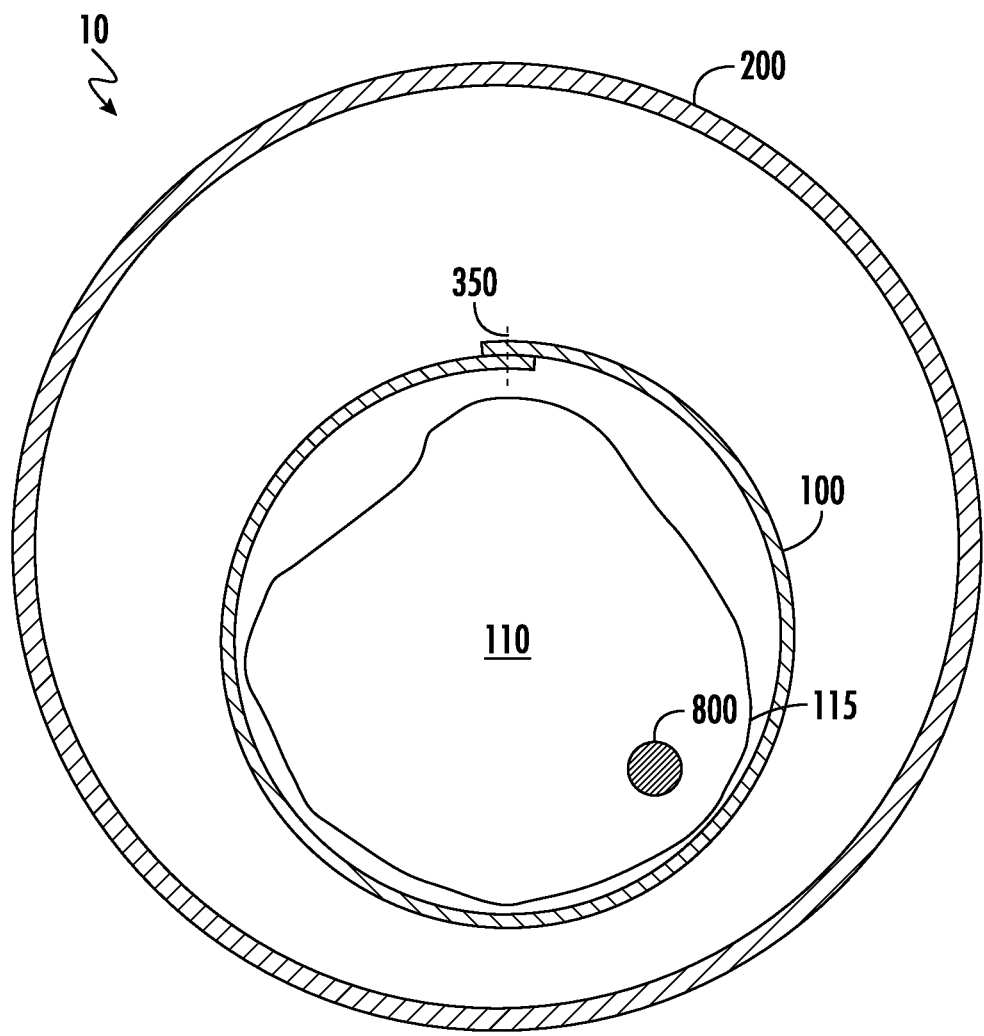
FIG. 4 illustrates one embodiment of the conduit system where the outer innerduct structure is a tube with a seam.

In another embodiment, as shown in FIG. 4, there is shown another embodiment of the blowable flexible innerduct as part of the conduit system 10 where the outer innerduct structure 100 is a seamed tube made from a textile having one seam along the longitudinal length to form the tube. The seamed tube contains one inner innerduct structure 115 which forms an inner longitudinal chamber 110 and is formed from a strip-shaped textile material that is then made into a tube having a seam 350 along the longitudinal length of the tube. This seam 350 may be stitched, ultrasonically welding, melted, or any other suitable attachment means.

Creating tubes from a strip-shaped textile material instead of as a seamless tube (using circular weaving or knitting for example) has many benefits. The first benefit is around splicing. It is much easier to splice flat strip-shaped textile materials together to create longer lengths then turn the strips into tubes than it is to splice together seamless tubes. Secondly, different sized tubes can be manufactured more easily with less machine downtime. Simply slitting the strip-shaped textile materials to different widths before turning them into tubes can create tubes with different diameters. For many seamless tube manufacturing processes, the setup of warps and/or weft would have to be redone in order to change the diameter of the tube being produced.

Figure 5:
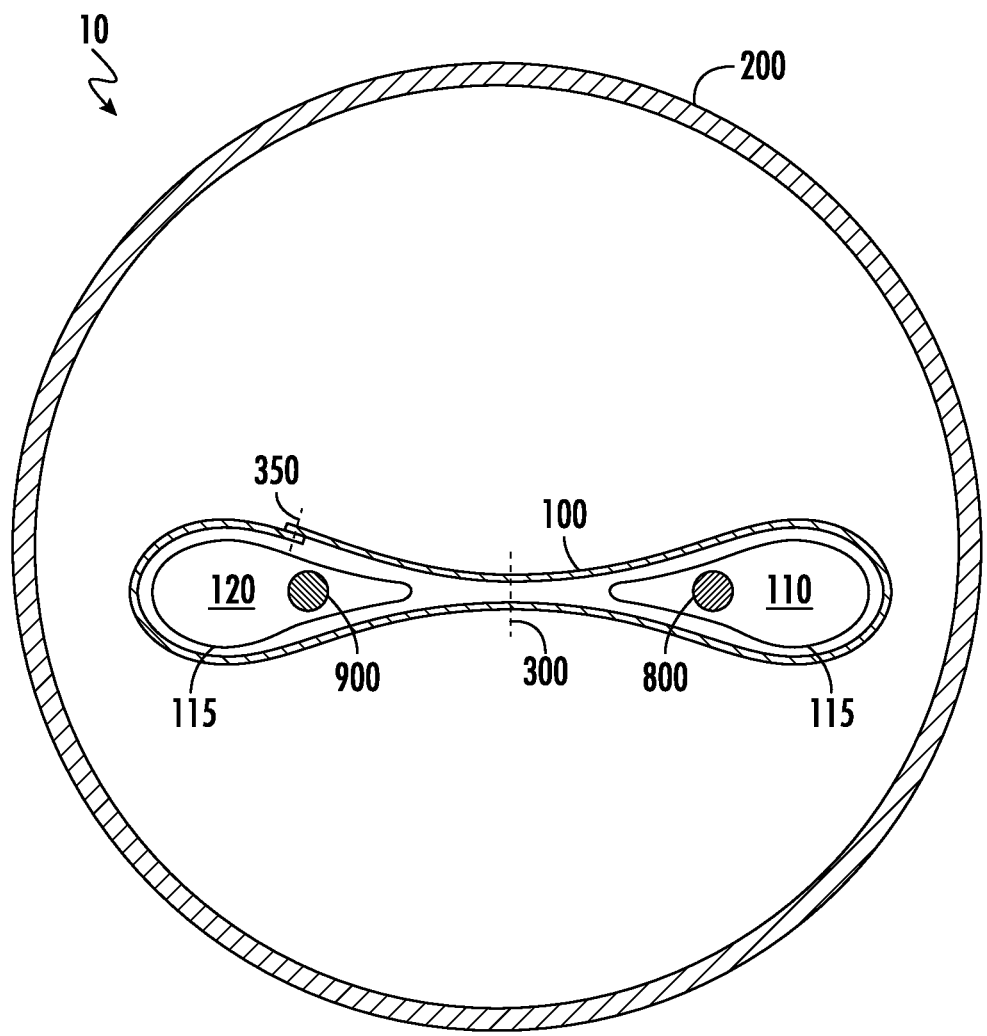
FIG. 5 illustrates one embodiment of the conduit system where the outer innerduct structure is a tube with a seam such that two chambers are formed.

The seamed tube may be used as is, such as shown in FIG. 4, or it may have an attachment 300 which divides the tube into multiple chambers, such as shown in FIG. 5. The outer innerduct structure 100 of FIG. 5 contains an attachment 300 that creates two outer longitudinal chambers. Each of those outer longitudinal chambers contains an inner innerduct structure 115 which forms an inner longitudinal chamber 110, 120. In one embodiment, the attachment 300 is in the center blowable flexible innerduct, defined to be approximately equidistant from the two edges of the structure. This is preferred to create chambers with all approximately the same size. In another embodiment, the attachment 300 is off-center, meaning that it is not in the center of the structure. This creates a chamber to be larger than the chamber on the other side. This may be preferred to accommodate wires, cables 800, pull tapes 900, etc. of varying sizes.

Figure 6:
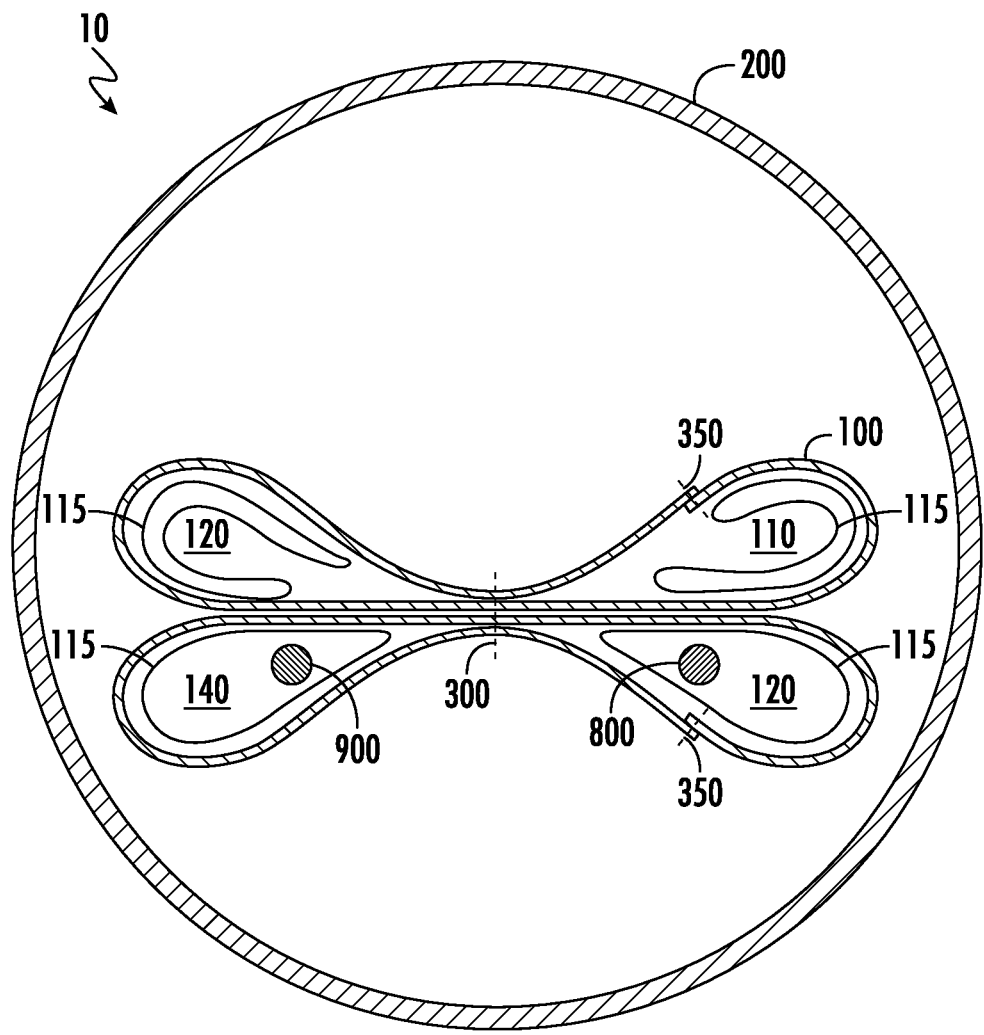
FIG. 6 illustrates one embodiment of the conduit system where the outer innerduct structure is multiple tubes with seams attached together.

In another embodiment as shown in FIG. 6, the outer innerduct structure 100 comprise multiple seamed textile tubes which are attached together by the attachment 300. The seam 350 can be placed in any suitable location about the circumference of the tube(s) and even in the area of the attachment 300 itself. The seams on each tube within the innerduct structure 100 may be in different locations.

In one embodiment, the attachment 300 is in the center of the middle region, defined to be approximately equidistant from the two edges of the structure. This is preferred to create chambers with all approximately the same size. In another embodiment, the attachment 501 is off-center, meaning that it is not in the center of the structure. This creates chambers in one of the margin regions to be larger than the chambers in the other margin region. This may be preferred to accommodate wires, cables, pull tapes, etc of varying sizes.

Figure 7:
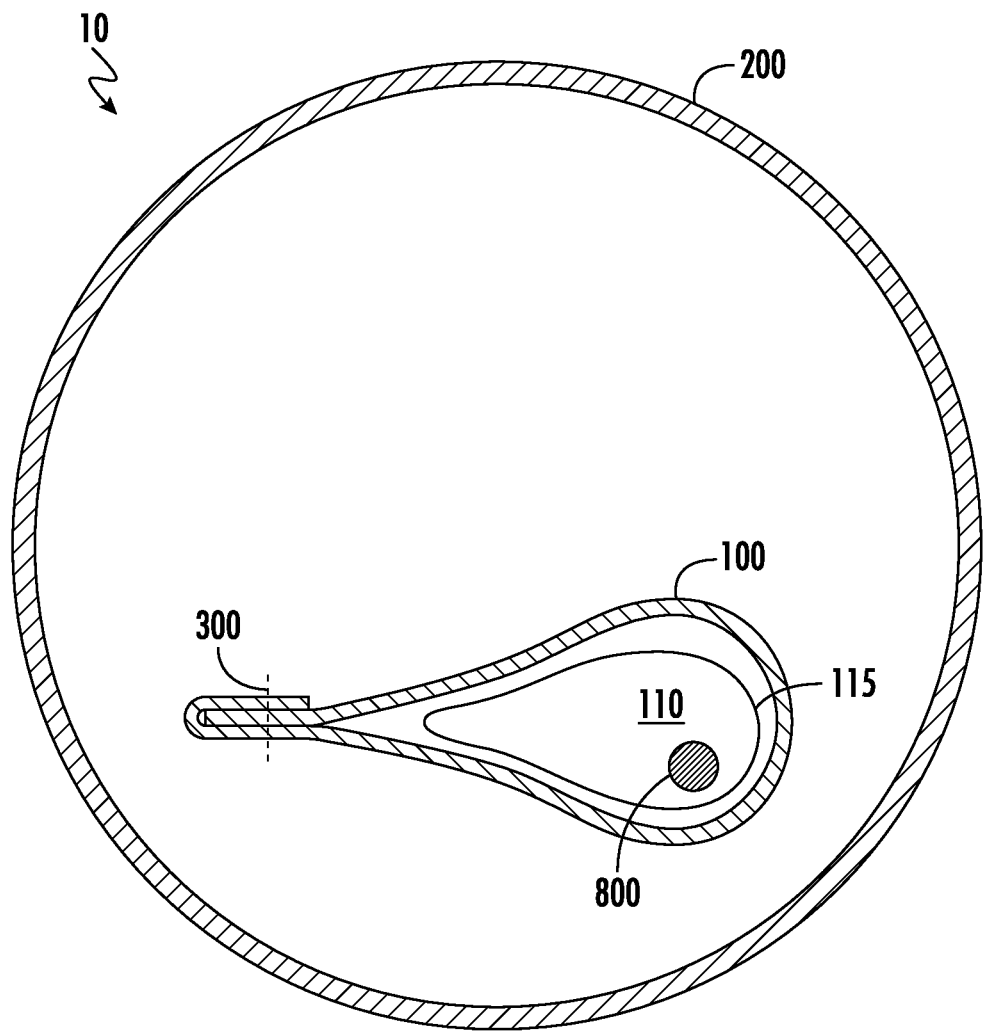
FIG. 7 illustrates one embodiment of the conduit system where the outer innerduct structure has a tear drop configuration with one chamber.

In FIG. 7, the outer innerduct structure 100 is in the form of a single tear-drop configuration within the conduit 200. For a single tear-drop, a strip shaped textile is folded about its longitudinal axis and the edges are attached together with attachment 300. This creates an outer longitudinal chamber which contains an inner longitudinal chamber 110. Inside the chamber 110 can be placed a pull tape, cable, mini-cable, etc. In one embodiment, the edges of the strip-shaped textile of the outer innerduct structure 100 are folded over to improve seam strength and reduce friction.

Figure 8:
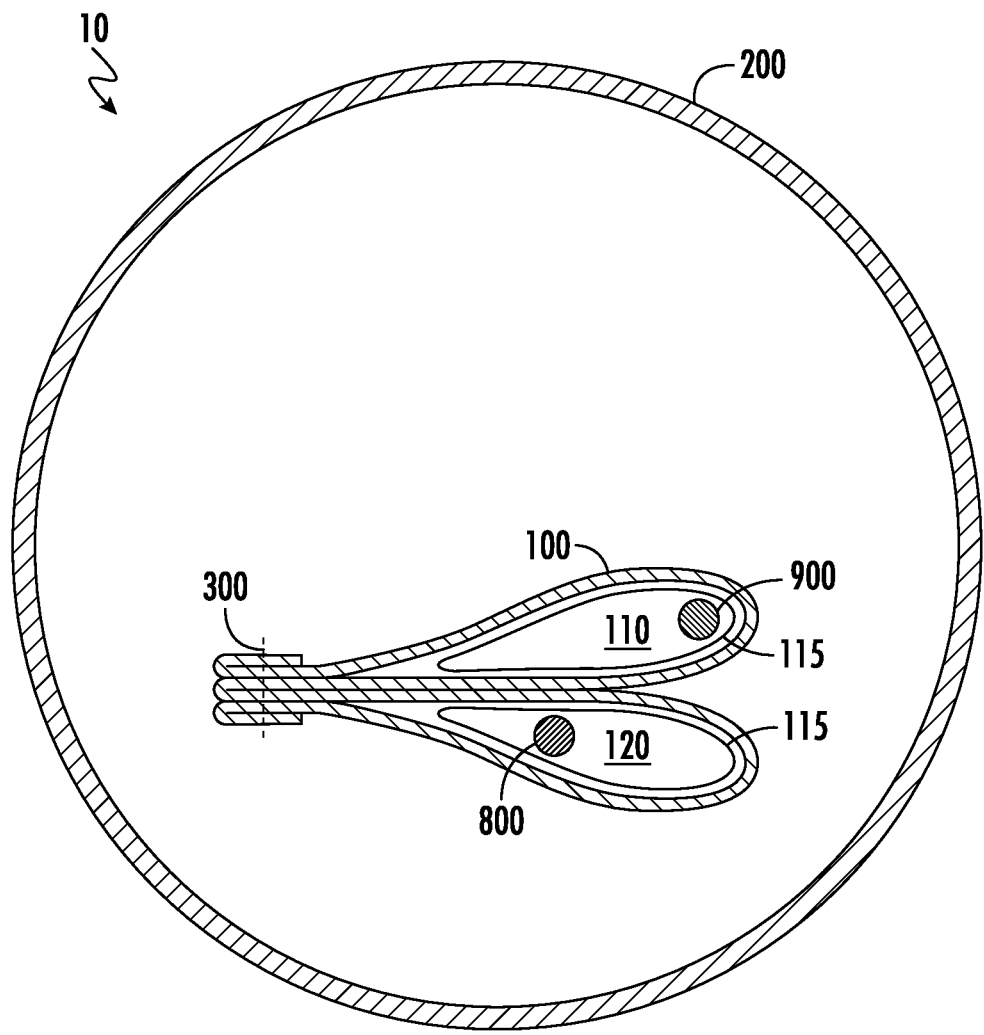
FIG. 8 illustrates one embodiment of the conduit system where the outer innerduct structure has a tear drop configuration with multiple chambers.

In another embodiment shown in FIG. 8, the outer innerduct structure 100 is a multi-chambered tear-drop configuration. The innerduct structure in FIG. 8 contains 2 outer longitudinal chambers, but the innerduct structure can contain any suitable number of outer longitudinal chambers such as 2 or more, 3 or more, 4 or more, 5 or more, or 6 or more. In one embodiment, the multi-chambered tear-drop configuration can be formed from multiple strip-shaped lengths of textile folded to create individual compartments that are then attached together. The outer innerduct structure 100 is constructed with a common seam, which secures the folds, as well as the cut edges along the length of the textile, which are folded under, to improve seam strength and reduce friction. In another embodiment, the tear drop shape and chambers may be formed from a single textile that is folded multiple times. This embodiment is what is shown in FIG. 8, where one strip-shaped textile is folded and attached to form two outer longitudinal chambers. Within each of these chambers is a inner innerduct structure 115.

Figure 9:
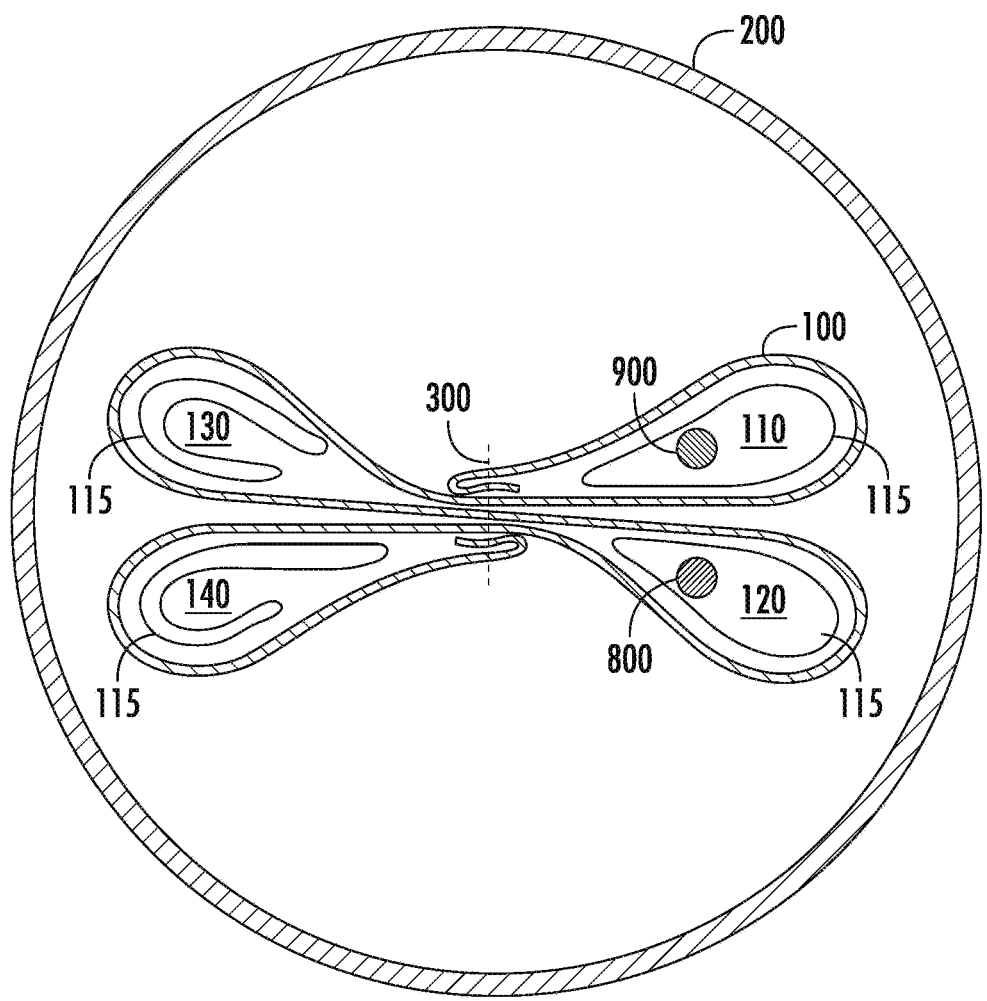
FIG. 9 illustrates one embodiment of the conduit system where the outer innerduct structure has multiple chambers formed from one strip shaped textile.

Referring to FIG. 9, there is shown another embodiment of the blowable flexible innerduct within a conduit 200. The outer innerduct structure 100 contains three regions, a first area, a middle area, and a second area. In the outer innerduct structure 100 of FIG. 9, the structure 100 contains one striped-shaped textile that forms four flexible outer longitudinal chambers. Each of the outer chambers contains an inner longitudinal chamber.

For the embodiment shown in FIG. 9, each strip-shaped textile has a first edge and a second edge. The first and second edges are located in the middle area of the flexible innerduct structure. Each textile strip extends outwards from the middle area to either the first area or the second area and then returns to the middle area forming an outer longitudinal chamber. The innerduct structure may contain 2 or 3 or more strip-shaped textiles and at least one of those strip shaped textiles extends from the first area to the second area. The innerduct structure contains at least one strip-shaped textile that contains both a fold in the first area and a fold in the second area.

In one preferred embodiment, all of the chambers are formed from a single strip-shaped textile such as shown in FIG. 9 as it is able to create the desired number of chambers with the fewest number of strip-shaped textile edges in the middle region of the structure 100.

In some embodiments, the edge(s) of the strip-shaped textiles are folded over. This may be preferred to prevent the edges of the textile getting caught on other materials during the manufacture, installation, and/or use of the innerduct structure and also helps prevent the edge of the strip-shaped textile from coming loose from the attachment 300. For example, the attachment 300 may be a line of stitching and if there is some fraying of the edge of the strip-shaped textile, then some of the textile may come loose and one or more of the chambers may not be fully closed.

Preferably, the textile(s) of the outer longitudinal structures are only attached together and to themselves at the attachment 300 and are not attached in the first area, second area, first edge, or second edge. This allows the chambers to spread and better fill the conduit. In the structure shown in FIGS. 9, when installed into a conduit the chambers of the blowable flexible innerduct spread to fill the conduit and have a dragonfly or butterfly like appearance in cross-section.

In one embodiment, the attachment 300 is in the center of the middle region, defined to be approximately equidistant from the two edges of the structure. This is preferred to create chambers with all approximately the same size. In another embodiment, the attachment means 300 is off-center, meaning that it is not in the center of the structure. This creates chambers in one of the areas to be larger than the chambers in the other area. This may be preferred to accommodate wires, cables, pull tapes, etc. of varying sizes.

In one preferred embodiment, the outer innerduct structures 100 are preferably made using woven textiles. The woven textile has a plurality of warp yarns running the warp direction of the woven textile. The woven textile also contains a plurality of weft yarns running in a generally perpendicular direction relative to the warp direction of the textile. The weft yarns are interwoven with the warp yarns, where the warp yarns extend in a predefined crossing pattern above and below the weft yarns. In one preferred embodiment, the textile is a plain weave textile. The textile may be any other suitable weave pattern including twill and sateen. In other embodiments, nonwovens or knits may be used as the textile for the outer innerduct structures.

The yarns in the woven textile may be any suitable yarn. The selection of the types, sizes, and comparisons of each of the yarns in the woven textile contribute the end products of the woven textile. "Yarn", in this application, as used herein includes a monofilament elongated body, a multifilament elongated body, ribbon, strip, yarn, tape, fiber and the like. The woven textile may contain one type of yarn or a plurality of any one or combination of the above. The yarns may be of any suitable form such as spun staple yarn, monofilament, or multifilament, single component, bi-component, or multi-component, and have any suitable cross-section shape such as circular, multi-lobal, square or rectangular (tape), and oval.

The textile can be formed from a single plurality or type of yarn (e.g., the textile can be formed solely from yarns comprising a blend of cellulosic fibers and synthetic fibers, such as polyamide fibers), or the textile can be formed from several pluralities or different types of yarns (e.g., the textile can be formed from a first plurality of yarns comprising cellulosic fibers and polyamide fibers and a second plurality of yarns comprising an inherent flame resistant fiber). The yarns may be formed of (but are not limited to) cellulosic fibers (such as cotton, rayon, linen, jute, hemp, cellulose acetate, and combinations, mixtures, or blends thereof), polyester fibers (e.g., poly(ethylene terephthalate) fibers, poly(propylene terephthalate) (PET) fibers, poly(trimethylene terephthalate) fibers), poly(butylene terephthalate) fibers, and blends thereof), polyamide fibers (e.g., nylon 6 fibers, nylon 6,6 fibers, nylon 4,6 fibers, and nylon 12 fibers), polyvinyl alcohol fibers, an elastic polyester-polyurethane copolymer (SPANDEX®), flame-resistant meta-aramid (NOMEX®) and combinations, mixtures, or blends thereof. Certain embodiments of the textile of the invention contain yarns comprising inherent flame resistant fibers. As utilized herein, the term "inherent flame resistant fibers" refers to synthetic fibers which, due to the chemical composition of the material from which they are made, exhibit flame resistance without the need for an additional flame retardant treatment. In such embodiments, the inherent flame resistant fibers can be any suitable inherent flame resistant fibers, such as polyoxadiazole fibers, polysulfonamide fibers, poly(benzimidazole) fibers, poly(phenylenesulfide) fibers, meta-aramid fibers, para-aramid fibers, polypyridobisimidazole fibers, polybenzylthiazole fibers, polybenzyloxazole fibers, melamine-formaldehyde polymer fibers, phenol-formaldehyde polymer fibers, oxidized polyacrylonitrile fibers, polyamide-imide fibers and combinations, mixtures, or blends thereof. In certain embodiments, the inherent flame resistant fibers are preferably selected from the group consisting of polyoxadiazole fibers, polysulfonamide fibers, poly(benzimidazole) fibers, poly(phenylenesulfide) fibers, meta-aramid fibers, para-aramid fibers, and combinations, mixtures, or blends thereof.

In a preferred embodiment, the warp yarns are monofilament yarns. Monofilament yarns may be preferred because of their lower amount of crimp in a woven textile (as compared to a multifilament yarn) and so the monofilament yarns have less elongation as an innerduct would be pulled through a conduit. By way of example, the warp yarns may be selected from polyesters, polyolefins, such as polypropylene, polyethylene and ethylene-propylene copolymers, and polyamides, such as nylon and aramid, e.g. Kevlar®. Yarns having a peak elongation at peak tensile load of 45% or less, preferably 30% or less, are preferred. Monofilament yarns, including bi- and multi-component yarns, have been found to be particularly useful in innerduct applications. These materials have been found to impart desired properties to the woven textile. In one embodiment, all of the warp yarns are PET monofilament yarns as PET monofilament yarns have a good balance of properties versus cost.

By selecting warp yarns having a relatively low elongation at peak tensile load, it is possible to minimize lengthwise elongation of the innerduct structure during installation of the innerduct in a conduit, thereby avoiding "bunching" of the innerduct. Additionally, the elongation potential in the warp direction of the textile incorporated into an innerduct can be minimized by reducing the warp crimp during the weaving process. For example, the warp crimp may be reduced by increasing the tension on the warp yarns during weaving to achieve a warp crimp of less than 5%, as measured by ASTM D3883—Standard Test Method for Yarn Crimp and Yarn Take-Up in Woven Textiles. Reducing the warp crimp in the textile, especially a plain weave textile, results in an increase in the crimp of the filling yarn, which has the further advantage of increasing the seam strength along the longitudinal edges of the sections of textile used to construct the innerduct.

In one embodiment, warp yarns having a denier of from 350 to 1,200, preferably 400 to 750, may be employed. The end count (yarns per inch in the warp) typically range from 25 to 75 ends per inch, preferably from 35 to 65 ends per inch. In one embodiment of the invention a plain weave textile having 35 to 65 ends per inch of 400 to 750 denier monofilament polyester warp yarns is provided.

The weft yarns may be any suitable yarn including polyesters, polyolefins, such as polypropylene, polyethylene and ethylene-propylene copolymers, and polyamides, such as nylon and aramid, e.g. Kevlar®, and mixtures thereof. Yarns having a peak elongation at peak tensile load of 45% or less, preferably 30% or less, are preferred.

The terms "pick," "picks," "picks per inch" and "ppi" are intended to refer to (a) one filling yarn carried through a shed formed during the weaving process and interlaced with the warp yarns; and (b) two or more filling yarns carried through a shed during the weaving process, either separately or together, and interlaced with the warp yarns. Thus, for the purposes of determining the picks per inch of a woven textile, multiple-inserted filling yarns are counted as a single pick.

The terms "multiple insertion" and "double insertion" are intended to include (a) multiple filling yarns inserted in the shed of the loom together; (b) multiple filling yarns inserted separately, while the shed of the loom remains the same; and (c) multiple filling yarns inserted separately, where the shed of the looms remains substantially the same, that is, the position of 25% or less of the warp yarns are changed between insertions of the yarns. In one preferred embodiment, at least a portion of the picks of weft yarns are multiple-inserted.

Other suitable weave patterns may be used as the weave pattern in the first weave zone. The terms "woven" and "interwoven" are meant to include any construction incorporating inter-engaging formation strips. By way of example only, and not limitation, it is contemplated that the weft yarns may pass over two or more adjacent warp yarns 100 before transferring to a position below one or more adjacent warp yarns thereby forming a so-called twill weave. Suitable twill weaves include both warp-faced and fill-faced twill weaves, such as 2/1, 3/1, 3/2, 4/1, 1/2, 1/3, or 1/4 twill weaves. The weave may also be, for example, satin, basket-weave, poplin, jacquard, and crepe weave textiles. In one embodiment, the woven textile may contain The textile may contain one weave pattern along the length of the textile or may have different zones of varying weave patterns along the machine direction of the textile. In the embodiments where the textile contains multiple zones, the first weave zone may have any suitable weave pattern. Suitable plain weaves include, but are not limited to, ripstop weaves produced by incorporating, at regular intervals, extra yarns or reinforcement yarns in the warp, fill, or both the warp and fill of the textile material during formation. Plain weaves are preferred because give stability and structure to the textile. If the first weave zone were too small or eliminated completely, then the textile may be too loose (with the warps and wefts moving relative to one another too easily) and would not be as suitable for an innerduct structure. In one embodiment, the woven fabric may be a partial float weave fabric described in U.S. Pat. Nos. 10,254,498, 10,829,874, and 11,008,680, which are herein incorporated by reference.

In the weft direction, using a variety of different yarns is preferred to tailor the physical properties of the final textile and structure. Monofilament yarns have are stiffer than multifilament yarns (keeping the denier and materials the same). Multifilament yarns are more flexible. Using both monofilament and multifilament weft yarns produces a balance between flexibility and stiffness. Incorporating some multifilament yarns (because they are less stiff), also lowers the opening force in an innerduct, the amount of force required to push a cable through the individual cell. Multiple or double-inserted multifilament yarns are preferred as they have a larger denier and therefore the cable "rides" along these ridges in the textile. Because there is less surface area of the textile in contact with the cable, the friction decreases and the pulling tension required to pull the cable in will typically be lower.

In one embodiment, the textile comprises a UV stabilizer. The stabilizer may be compounded or otherwise formed in the yarns, be a coating on the yarns, or a coating on the entire textile. It is slightly counterintuitive to place a UV stabilizer in a product that goes under the ground in a pipe, but it has been found that prior to installation, rolls of innerduct may sit outside in the elements and sun for up to a year before installation. The UV stabilizer serves to protect the physical properties of the textile and innerduct until it is installed and protected from UV sources. UV stabilizers include materials that inhibit photoinitiation (e.g., UV absorbers (UVAs) and excited state quenchers), and materials that inhibit the subsequent oxidative processes (e.g., radical scavengers and alkyl hydroperoxide decomposers). Any suitable UV stabilizer may be used, for example, carbon black, titanium dioxide, and hydrobenzophenone.

Referring back to FIG. 1, the blowable flexible innerduct 310 contains an inner innerduct structure 115 which forms at least one inner longitudinal chamber 110. Each inner longitudinal chamber 110 is located within the outer longitudinal chamber formed by the outer innerduct structure. In the embodiment shown in FIG. 1, there is one inner longitudinal chamber within the outer longitudinal chamber, but there are embodiments where more than one inner longitudinal chamber could be located in a single outer longitudinal chamber. In another embodiment where there are multiple outer longitudinal chambers (such as in FIG. 3), not all of the outer longitudinal chambers have to contain an inner longitudinal chamber, it may be desirable for each least one outer longitudinal chamber to not contain an inner longitudinal chamber.

The inner longitudinal chamber comprises an inflatable tube. This tube may be any suitable inflatable tube, but is preferably air, vapor, and water impermeable, light and flexible. In one embodiment, the inflatable tube is seamless formed from a process such as blow extrusion. In another embodiment, the tube is formed from a narrow plastic sheet that is folded over itself and its edges are attached and sealed together. The edges can be sealed such that the edges align forming a tear drop looking shape to the tube or the edges can be on top of one another such that a more circular cross-sectional shape is created. This adhesion can be formed from a pressure sensitive adhesive, a thermal adhesive, ultrasonic welding, or any other known manufacturing process.

The inflatable tube may be made out of any suitable material including any thermoplastic and thermoset polymers. Preferably, the inflatable tube comprises a thermoplastic polymer. In one embodiment, the polymer is selected from the group consisting of low density polyethylene (LDPE), medium density polyethylene (MDPE), high density polyethylene (HDPE), low low density polyethylene (LLDPE), polypropylene (PP), polyester (PET), polyamide (PA). In one embodiment, the thermoplastic is polyethylene, preferably medium density polyethylene. The materials that form the inflatable tube preferably are airtight (air impermeable), good strength at a low weight, low friction, and low cost. The inflatable tube may contain a single polymer or a blend of polymer, may have additional fillers added into the polymer, and/or have a single layer or be co-extruded and have multiple layers.

It has been found that polyethylene has low coefficient of friction (making it easier for the cable or other elongated member to slide into the tube than compared to a material having a higher coefficient of friction like some urethane elastic type materials). The inflatable tube, in one embodiment, has a wall thickness of between about 0.1 and 1 mm, more preferably less than about 0.5 mm, more preferably less than 0.25 mm. It has been found that this thickness produces an inflatable tube with good physical properties and is cost efficient. The inflatable tube having this thickness has also been shown to be sufficient to withstand (in combination with the outer chamber) the typically pressures used in cable and innerduct blowing systems (which are typically much lower than water based systems).

The goal of the blowable flexible innerduct is to have the strength and characteristics of a flexible innerduct, while also being mostly impervious to air, vapor, and water so that the blowable flexible innerduct and/or the cables to be placed within the innerduct structure are able to be blown in. Some previous attempts to make a blowable flexible innerduct structure included using a textile with a coating on it. Prototypes using coated textiles tended to fail through air leaks in the stitching (attachment area) or the seam/stitching failing during the blowing test. The combination of the inner innerduct structure being an inflatable tube giving the air impermeability and the outer innerduct structure being a textile structure giving the strength creates the blowable flexible innerduct. Air permeability is typically measured using ATSM D737. When combined into the blowable flexible innerduct, the inner and outer chamber take on the preferred low air permeability.

The inner longitudinal chamber (being an inflatable tube) alone has an air permeability of less than about 2 $cm^3/cm^2/s$ (at 10 inches of water column pressure) or 1 cfm, more preferably less than about 1 $cm^3/cm^2/s$ more preferably less than about 0.5 $cm^3/cm^2/s$ (at 10 inches of water column pressure). In another embodiment, the inner longitudinal chamber (being an inflatable tube) alone has an air permeability of between about 0 and 0.5 $cm^3/cm^2/s$ (at 10 inches of water column pressure), more preferably between about 0.001 and 0.5 $cm^3/cm^2/s$, or more preferably less than about 0.2 cfm.

The outer longitudinal chamber (being a textile) preferably has a very open structure meaning that a significant portion of the surface of the textile is open or missing yarns. This creates a very porous textile that air, water, and light can easily pass through. Alone, the textile has an air permeability of greater than about 5 $cm^3/cm^2/s$ (at 10 inches of water column pressure), more preferably greater than about 10 $cm^3/cm^2/s$, more preferably greater than about 25 $cm^3/cm^2/s$, preferably greater than 100 cfm, more preferably greater than 200 cfm. In another embodiment, the outer longitudinal chamber (being a textile) alone has an air permeability of between about 5 and 200 $cm^3/cm^2/s$ (at 10 inches of water column pressure), more preferably between about 10 and 100 $cm^3/cm^2/s$.

When the inner and the outer innerduct chambers are combined to form the blowable flexible innerduct (with the inner chamber located within the outer chamber), the blowable flexible innerduct has an air permeability of less than about 2 $cm^3/cm^2/s$ (at 10 inches of water column pressure), more preferably less than about 1 $cm^3/cm^2/s$ more preferably less than about 0.5 $cm^3/cm^2/s$ (at 10 inches of water column pressure). In another embodiment, the inner and the outer innerduct chambers combined to form the blowable flexible innerduct (with the inner chamber located within the outer chamber) has an air permeability of between about 0 and 0.5 $cm^3/cm^2/s$ (at 10 inches of water column pressure), more preferably between about 0.001 and 0.5 $cm^3/cm^2/s$. In another embodiment, the inner and the outer innerduct chambers combined to form the blowable flexible innerduct (with the inner chamber located within the outer chamber) has an air permeability of less than cfm, more preferably less than about 0.2 cfm.

Burst testing was conducted using a custom testing setup. In order is an air regulator, a value, a first pipe, the innerduct structure to be tested, and a second pipe with the end of the pipe opposite to the innerduct being capped. The innerduct structure is clamped onto the pipes and pressurized air is added, being increased slowly in steps over time until the innerduct breaks, leaks, or bursts. The maximum psi before the innerduct structure fails (breaks, leaks, or bursts) is considered the burst strength. When combined into the blowable flexible innerduct, the inner and outer chamber take on the preferred high burst strength.

In one embodiment, the inner longitudinal chamber (being an inflatable tube) alone has a burst strength of less than about 50 psi, more preferably less than about 35 psi. In another embodiment, the inner longitudinal chamber (being an inflatable tube) alone has a burst strength of between about 5 and 40 psi, more preferably between about 10 and 25 psi. In another embodiment, the inner longitudinal chamber (being an inflatable tube) alone has a burst strength of less than about 75 psi, more preferably less than about 70 psi. In another embodiment, the inner longitudinal chamber (being an inflatable tube) alone has a burst strength of between about 25 and 80 psi, more preferably between about 40 and 70 psi.

The outer longitudinal chamber (being a textile) is much stronger. When the inner and the outer innerduct chambers are combined to form the blowable flexible innerduct (with the inner chamber located within the outer chamber), the blowable flexible innerduct has a burst strength of greater than about 50 psi, more preferably greater than about 60 psi, and in another embodiment between about 55 and 100 psi.

In one embodiment, the polymer forming the inflatable tube has an elongation at break of preferably less than about 50%, more preferably less than about 30%. This contrasts to other tubes that may be more elastic and have elongations at break of 200-300% or more. In other embodiments, the polymer forming the inflatable tube has an elongation at break of preferably greater than about 50%, greater than about 100%, more preferably more than about 200%.

Preferably, the inner innerduct chamber is movable within the outer innerduct chamber. This means that the inner innerduct chamber can move relative to the outer innerduct chamber is not permanently attached or is not attached at all to the outer innerduct structure.

Figure 2A:
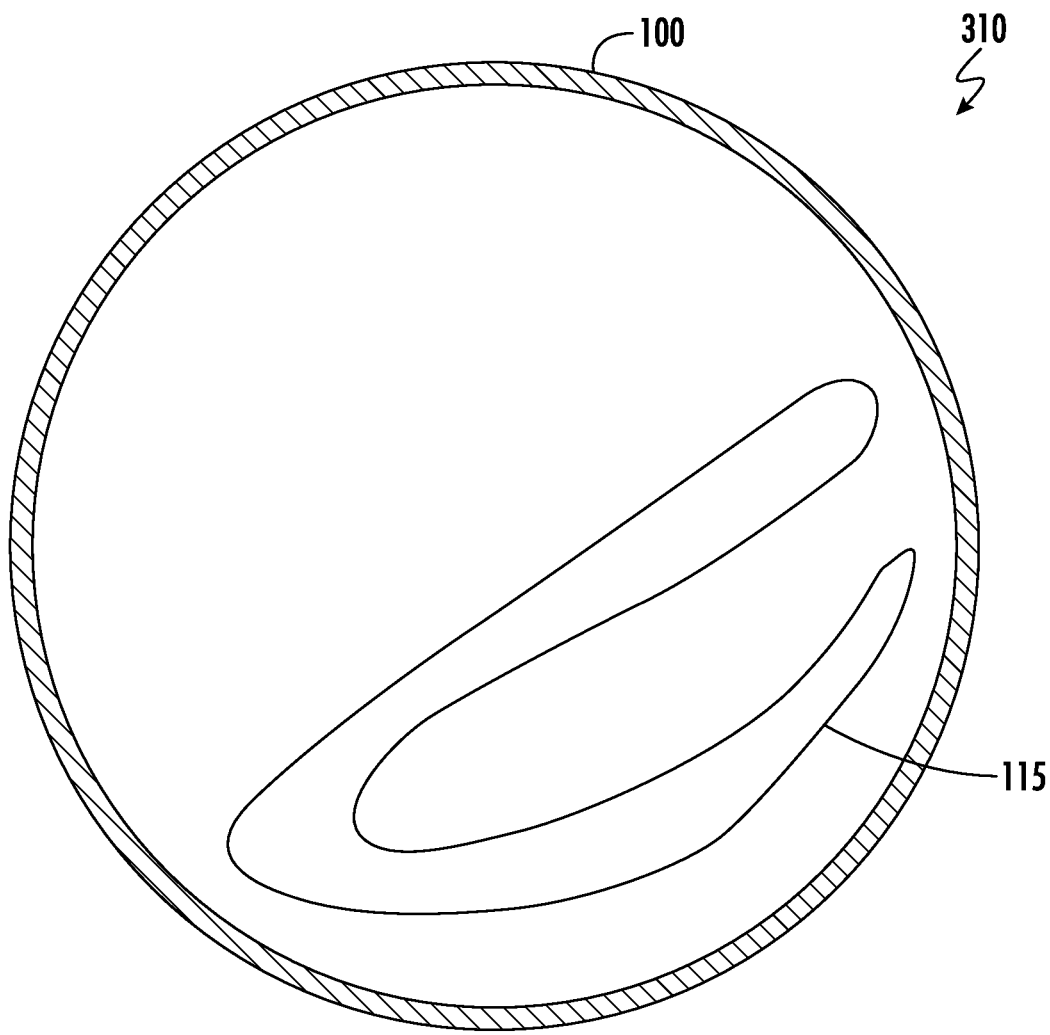
FIGS. 2A-2C illustrate the relationship between the outer and inner innerduct structures during installation and use.
Figure 2B:
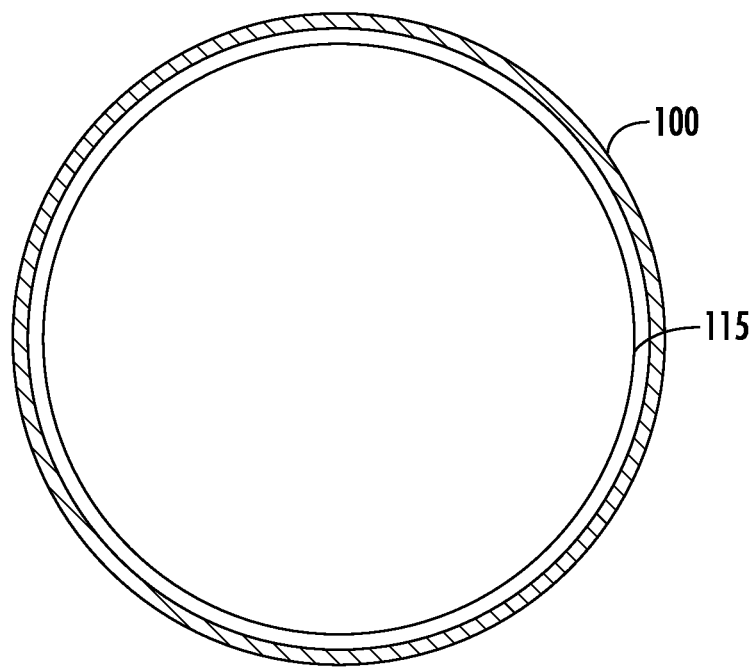
Figure 2C:
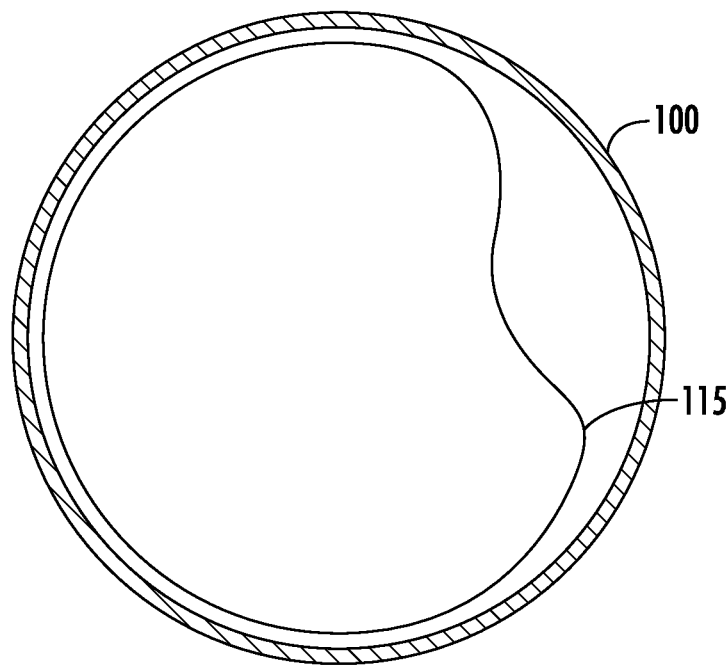

FIG. 2A illustrates one embodiment of the blowable flexible innerduct 310 where the inner innerduct structure 115 being an inflatable tube is placed within the outer innerduct structure 100 being a seamless textile. The inner innerduct structure may be folded, crimped, or otherwise manipulated to make the insertion of the inner innerduct structure into the outer innerduct structure easier. FIG. 2B illustrates what the blowable flexible innerduct 310 looks like when air is introduced into the inner innerduct structure 115. The inner innerduct structure 115 expands or opens to fill the outer innerduct structure 100 and the outer innerduct structure 100 constrains the inner innerduct structure 115, providing burst strength to the inner innerduct structure 115 and preventing it from popping. FIG. 2C illustrates the blowable flexible innerduct 310 after air pressure is released from the blowable flexible innerduct 310. In this case, the inner innerduct structure 115 may stay against the inner surface of the outer innerduct structure 100 or may contract/shrink/fold back away from the outer innerduct structure 100.

As the outer innerduct structure 100 constrains and provides burst strength for the inner innerduct structure 115, the relative size of the two chambers is important. If the inner longitudinal chamber is too small (has too small a diameter), then the inner longitudinal chamber will burst or spring a leak as it is expands from the air pressure before reaching the inner surface of the outer longitudinal chamber. The diameter of the longitudinal chambers is measured as the diameter when the chamber is completely flattened. In one embodiment, the diameter of the inner longitudinal chamber is between about 50 and 200% of the outer longitudinal chamber, more preferably between about 60 and 100%, more preferably between about 70 and 95%, more preferably between about 75 and 90%. The more elastic (stretchy) the inner longitudinal chamber is made of smaller the diameter it can be relative to the outer longitudinal chamber as it would be able to stretch to the size of the outer longitudinal chamber without breaking. In another embodiment, the inner longitudinal chamber fills at least about 60% of the cross-sectional area of the outer longitudinal chamber. In a preferred embodiment, the inner longitudinal chamber fills at least about 75% of the cross-sectional area of the outer longitudinal chamber, or between about 70 and 95% of the cross-sectional area of the outer longitudinal chamber.

The blowable flexible innerduct may be constructed in any suitable manner. In one embodiment, the outer innerduct structure is formed and then the inner longitudinal chambers from the inner innerduct structure are placed inside of the outer longitudinal chambers. This may be preferred to make an already existing innerduct structure blowable. The inflatable tube may be pulled or blown into an existing innerduct structure (blowable or not) or piggybacked in with first cable blown or pulled into an innerduct structure.

In another embodiment, while the material (preferably a textile) of the outer innerduct structure is being formed into the at least one outer longitudinal chambers, the inner longitudinal chamber(s) are inserted. In the case of seamless tubes as the outer longitudinal chambers as shown in FIGS. 1 and 3, the inflatable tube would be introduced while the tube was being created (knitted, woven, circular woven, shuttle woven, etc). Concurrent to forming the outer innerduct structure, at least one inner longitudinal chamber is inserted into at least one of the outer longitudinal chambers.

In the case where a fabric is folded into the outer innerduct structure such as shown in FIGS. 4-9), the inflatable tube is preferably introduced while the fabric is being folded and secured into chambers. Concurrent to forming the outer innerduct structure, at least one inner longitudinal chamber is inserted into at least one of the outer longitudinal chambers.

The blowable innerduct structure may be pulled into the conduit, blown into the conduit, or incorporated into a conduit while the conduit is being manufactured. The cables or other elongated members to be placed inside of the innerduct structure can be blown or pulled into the chambers.

The figures also illustrate in some embodiments having cable 800 and and/or a pull tape or rope 900 in them. To draw the fiber optic, coaxial, or other cables through the innerduct structure, it is desirable in one embodiment to provide pull lines for such purpose. The pull lines are positioned within the compartments of the innerduct, preferably before installation of the innerduct within the conduit. By way of example, the pull lines may be tightly woven, relatively flat strips of material or may be a twisted ropes or multi-ply cords having a substantially round cross-section. A pull line being a pull rope is shown as element 900 in FIGS. 3, 5, 6, 8, and 9. In one embodiment, at least one of the inner chambers contains a cable.

Preferably, the innerduct and the pull line have respective values of elongation percentage which are substantially equal for a given tensile load. If elongation of the innerduct differs substantially from that of a pull line, one of those structures may lag relative to the other when they are pulled together through a conduit during installation, resulting in bunching of the innerduct. The pull lines may be formed of tightly woven, polyester material, which exhibits a tensile strength of between about 400 pounds and about 3,000 pounds. In one embodiment, the pull lines are a pull tape with a flat cross-sectional shape. In another preferred embodiment, the pull line is a pull rope with a circular or oval shaped cross-sectional shape. The pull rope is preferred as the innerduct structures (and their associated chambers) are very small and the pull rope takes up less space within the conduit. Preferably, the innerduct structure (all of the disclosed innerduct structures within the application) contain at least one pull rope within at least one chamber. In another embodiment, each chamber of the innerduct structure contains a pull rope.

The innerduct structure, after it is placed in the conduit (or in other embodiments before it is placed in the conduit) in one embodiment contains a cable 800. Preferably, at least one of the chambers of the innerduct structure contains a cable. The cable 800 may be any suitable cable from small or large diameter. In one embodiment, the cable is a mini-cable which has a smaller diameter than traditional cables. Preferably, the mini-cable has a diameter of less than about 15 mm, more preferably less than about 11 mm. The term "cable" is intended to include fiber optic cables, electrical wires, coaxial and triaxial cables, as well as any other line for transmitting electricity and/or electromagnetic signals.

The conduit 10 shown in the Figures may be any suitable conduit, for example, the conduit may be made of metal, synthetic polymer, such as thermoplastic polymer, clay or concrete. The passageway through the conduit may have a round, oval, rectangular, polygonal, or other cross-section shape. The present invention finds utility in combination with virtually any conduit system. Depending upon the relative size of the passageway in the innerduct, typically calculated as the inside diameter, persons skilled in the art may select from the width of the innerduct, number of compartments in each innerduct, and number of individual innerducts, to maximize the capacity of the conduit.

EXAMPLE

A blowable flexible innerduct was made according to one aspect of the invention. Air permeability was tested using ASTM D737. Burst testing was conducted using a custom testing setup. In order is an air regulator, a value, a first pipe, the innerduct structure to be tested, and a second pipe with the end of the pipe opposite to the innerduct being capped. The innerduct structure is clamped onto the pipes and pressurized air is added, being increased slowly in steps over time until the innerduct breaks, leaks, or bursts. The maximum psi before the innerduct structure fails (breaks, leaks, or bursts) is considered the burst strength.

Outer Innerduct Structure: A woven fabric made having warp yarns and weft yarns. The warp yarns were 520 denier monofilament polyester yarns in a 48 epi construction. The weft yarns were an alternating arrangement of 350 denier nylon monofilament yarns and 600 denier multifilament textured polyester yarns in a 24 picks per inch construction. The fabric was folded and stitched in a manner shown in the illustration of FIG. 9 to make an outer innerduct structure having a width of about 2.5 inches and containing four outer longitudinal chambers. The outer longitudinal chambers each have a diameter of approximately 1.2 inches. The air permeability of the woven fabric was between about 10 and 100 $cm^3/cm^2/s$ at 10 inches of water column pressure.

Inner Innerduct Structure: A plastic tube made from medium density polyethylene (MDPE) and having a nominal wall thickness of about 7 mil (0.18 mm) and a lay flat width (what is defined to be the diameter in this application) of about 1 inch. The air permeability of the plastic tube was about 0 $cm^3/cm^2/s$ at 10 inches of water column pressure. The burst strength of the plastic tube was about 18 psi.

Four inner innerduct structures were added to the outer innerduct structure such that each outer longitudinal chamber contained one plastic tube. The inner tubes were approximately 87% of the diameter of the outer chambers. The air permeability of one outer longitudinal chamber with one inner tube inside of it was about 0 $cm^3/cm^2/s$ at 10 inches of water column pressure. The burst strength of the outer longitudinal chamber and plastic tube together was 90 psi.

As one can see from the data above, the combination of the inner longitudinal chamber inside of the outer longitudinal chamber creates a blowable flexible innerduct with the desired low air permeability and high burst strength as is desired for a blowable flexible innerduct.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter of this application (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

What is claimed is:

1. A process of forming a blowable flexible innerduct comprising:
   forming an inner innerduct structure comprising at least one inner longitudinal chamber, wherein the at least one inner longitudinal chamber comprises an inflatable tube;
   forming a textile;
   concurrently forming an outer innerduct structure from the textile having at least one outer longitudinal chamber and inserting the at least one inner longitudinal chamber into at least one of the outer longitudinal chambers, wherein the inflatable tube has a wall thickness of less than about 0.5 mm, wherein the inner longitudinal chamber alone has an air permeability of less than about 1 cfm, wherein the outer longitudinal textile chamber alone has an air permeability of greater than about 100 cfm, and the outer longitudinal textile chamber together with the inner longitudinal chamber located inside the outer longitudinal textile chamber has an air permeability of less than about 1 cfm.

2. The process of claim 1, wherein forming the outer innerduct structure comprises folding at least one strip-shaped textile having two longitudinal edge portions of textiles about a centrally located longitudinal axis and adjoining their longitudinal edge portions to define at least an outer longitudinal chamber.

3. The process of claim 1, wherein forming the outer innerduct structure comprises folding at least two strip-shaped textiles each having two longitudinal edge portions of textiles about a centrally located longitudinal axis and adjoining their longitudinal edge portions to define at least two outer longitudinal chambers.

4. The process of claim 1, wherein forming the outer innerduct structure comprises forming at least one strip-shaped textile, wherein each strip-shaped textile comprises a first side and a second edge and extends in the longitudinal direction, and arranging the strip-shaped textiles such that all the first and second edges of the strips are located in the middle area, wherein each strip-shaped textile extends outwards from the middle area, folds about a fold axis located in either the first or second areas and returns to the middle area forming an outer longitudinal chamber, wherein at least one strip extends from the first area to the second area, wherein the outer innerduct structure comprises at least one fold in at least one strip of the textile in the first area and at least one fold in at least one strip of the textile in the second area, and wherein the strips are attached together in the middle area.

5. The process of claim 1, wherein the outer longitudinal textile chamber together with an inner longitudinal chamber located inside the outer longitudinal textile chamber has a burst strength of greater than about 60 psi.

6. The process of claim 1, wherein the inner longitudinal chamber alone has a burst strength of less than about 35 psi.

7. The process of claim 1, wherein the inner longitudinal chamber fills at least about 75% of the cross-sectional area of the outer longitudinal chamber.

8. The process of claim 1, wherein the inflatable tube has an elongation at break of greater than about 50%.

9. The process of claim 1, wherein the inner longitudinal chambers are configured to enclose and carry at least one cable.

10. The process of claim 1, wherein the inner longitudinal chamber is movable within the outer longitudinal textile chamber.

11. The process of claim 1, wherein the outer longitudinal textile chamber has a first diameter, and the inner longitudinal chamber has a second diameter and wherein the first diameter is between about 70 and 100% of the second diameter.

12. A process of forming a blowable flexible innerduct comprising:
    forming an inner innerduct structure comprising at least one inner longitudinal chamber, wherein the at least one inner longitudinal chamber comprises an inflatable tube;
    concurrently forming an outer innerduct structure having at least one outer longitudinal chamber and inserting the at least one inner longitudinal chamber into at least one of the outer longitudinal chambers, wherein the inflatable tube has a wall thickness of less than about 0.5 mm,
    wherein the inner longitudinal chamber alone has an air permeability of less than about 1 cfm, wherein the outer longitudinal textile chamber alone has an air permeability of greater than about 100 cfm, and the outer longitudinal textile chamber together with the inner longitudinal chamber located inside the outer longitudinal textile chamber has an air permeability of less than about 1 cfm.

13. The process of claim 12, wherein the outer longitudinal textile chamber together with an inner longitudinal chamber located inside the outer longitudinal textile chamber has a burst strength of greater than about 60 psi.

14. The process of claim 12, wherein the inner longitudinal chamber alone has a burst strength of less than about 35 psi.

15. The process of claim 12, wherein the inner longitudinal chamber fills at least about 60% of the cross-sectional area of the outer longitudinal chamber.

16. The process of claim 12, wherein the inflatable tube has an elongation at break of less than about 30%.

17. The process of claim 12, wherein the outer innerduct structure comprises at least one woven textile.

18. The process of claim 12, wherein the inner longitudinal chambers are configured to enclose and carry at least one cable.

19. The process of claim 12, wherein the inner longitudinal chamber is movable within the outer longitudinal textile chamber.

20. The process of claim 12, wherein the outer longitudinal textile chamber has a first diameter, and the inner longitudinal chamber has a second diameter and wherein the first diameter is between about 70 and 100% of the second diameter.

* * * * *